UNITED STATES PATENT OFFICE.

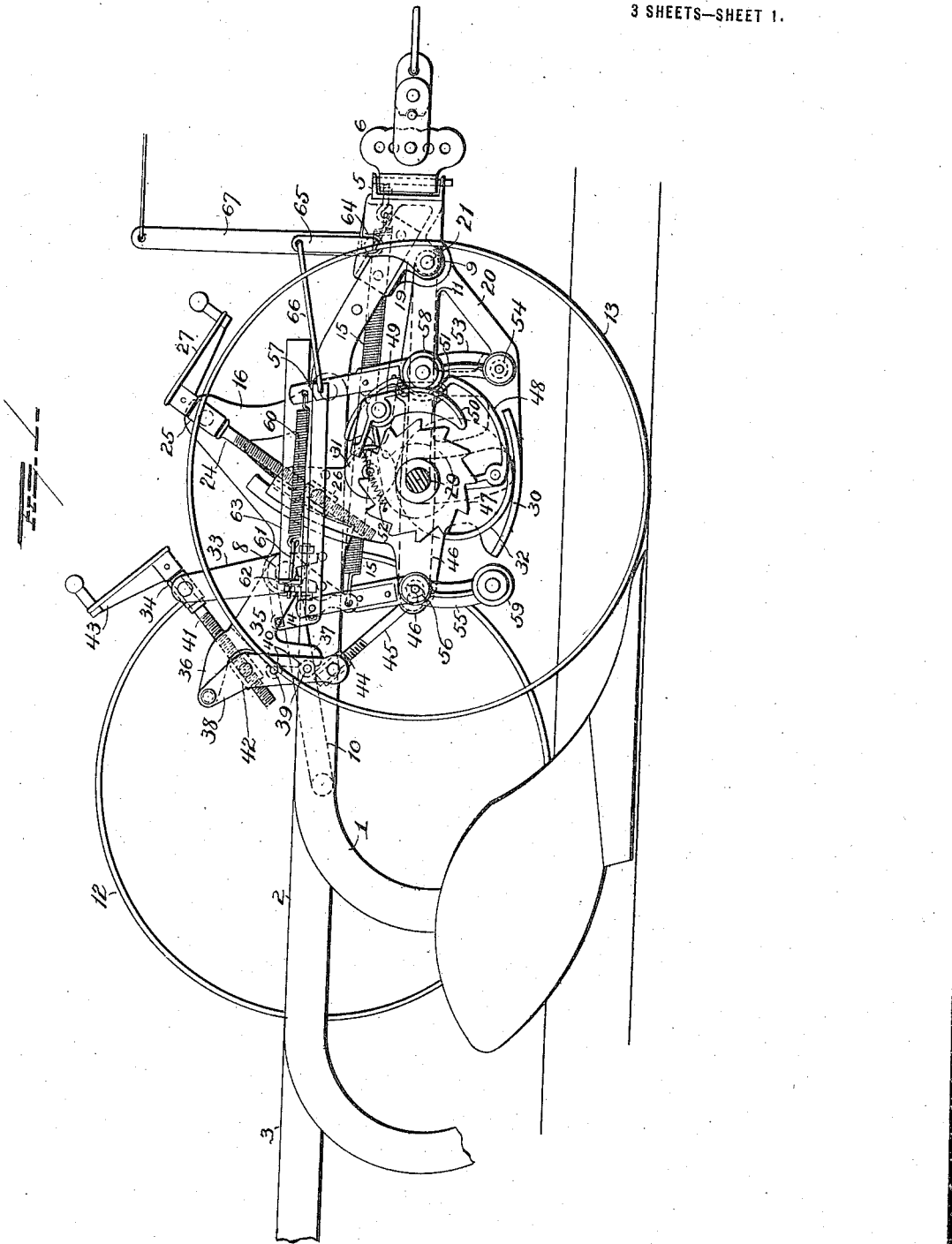

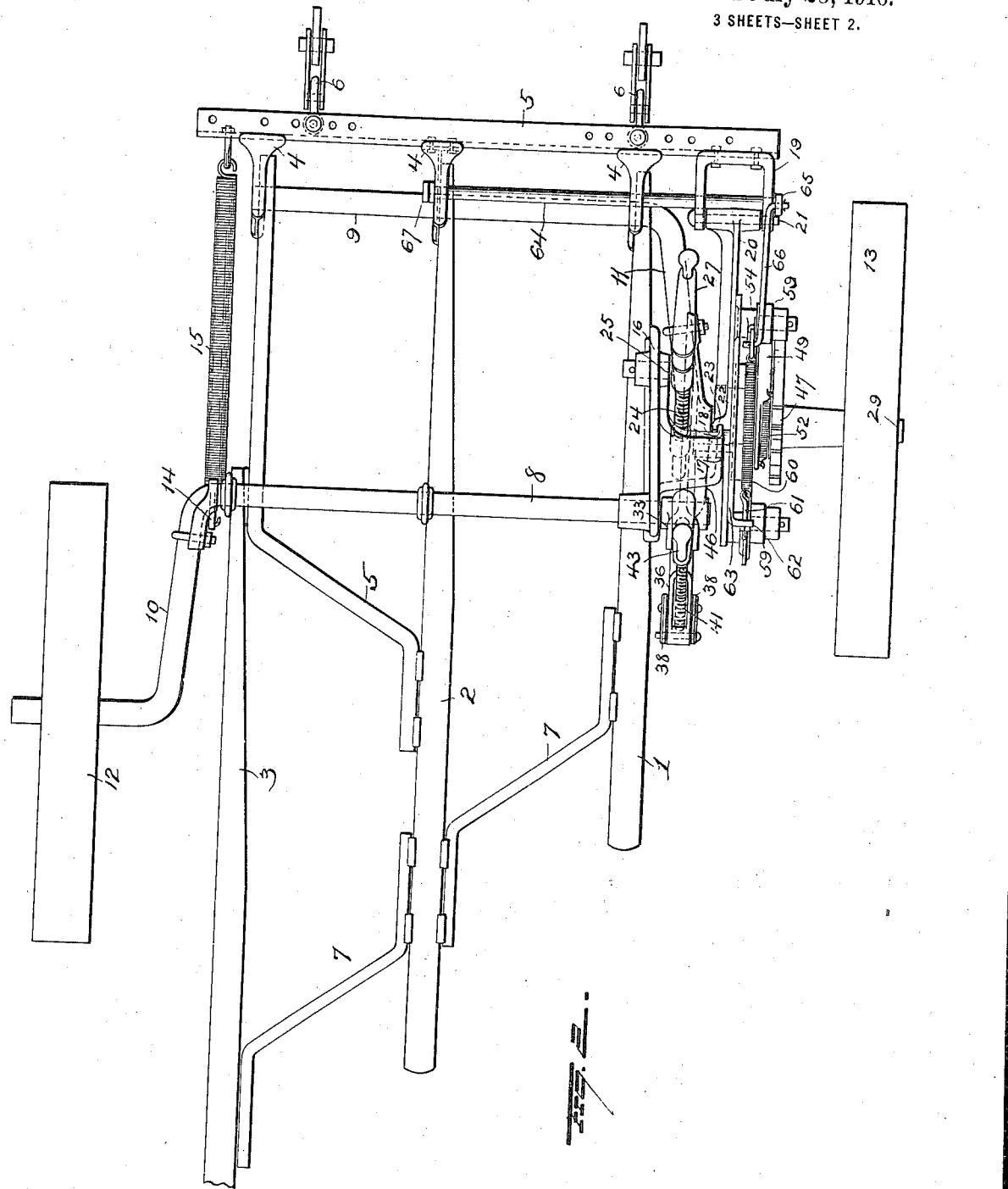

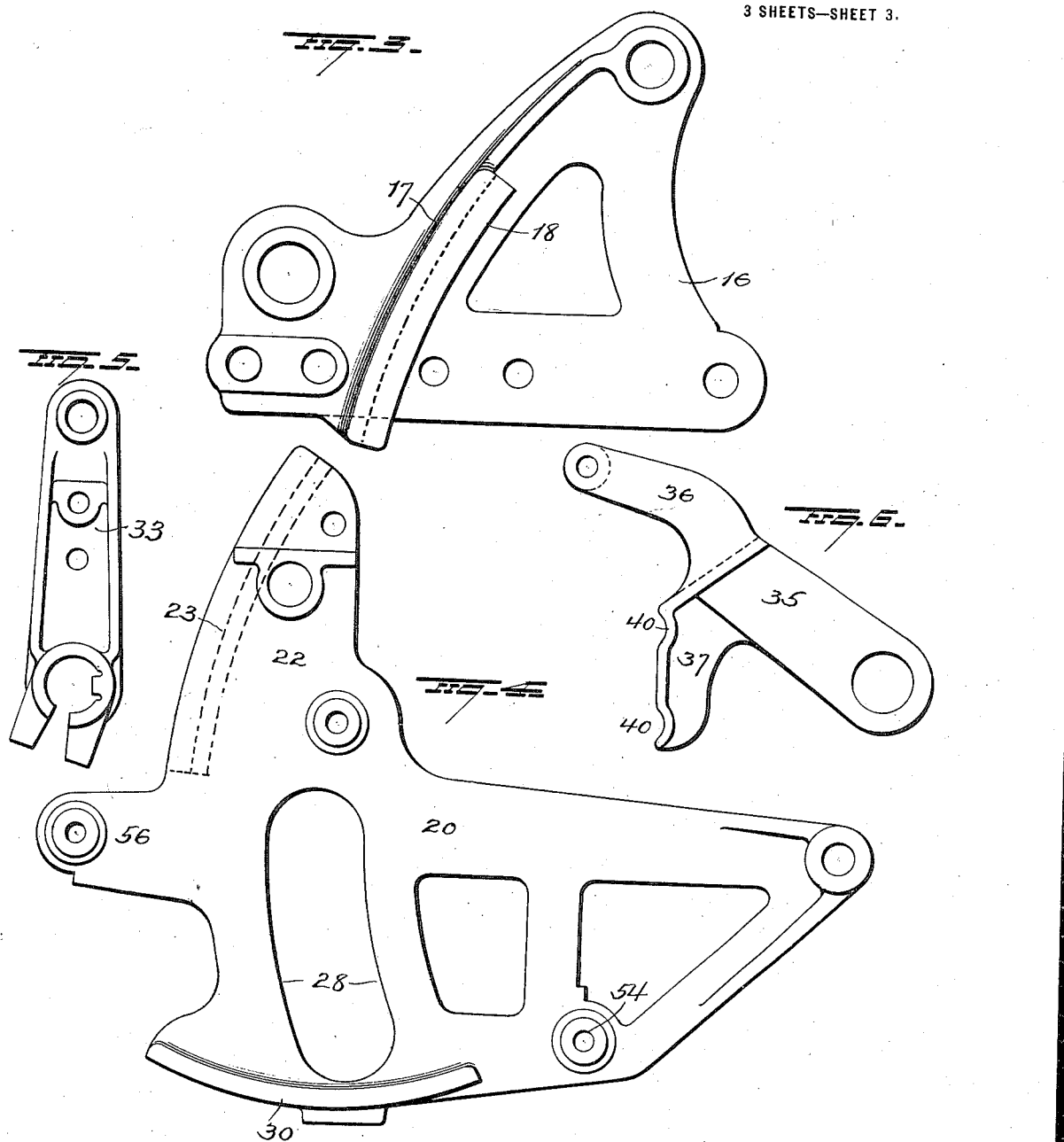

WILLIAM N. SPRINGER, OF SOUTH BEND, INDIANA, ASSIGNOR TO OLIVER CHILLED PLOW WORKS, OF SOUTH BEND, INDIANA.

ENGINE GANG-PLOW.

1,192,700.  Specification of Letters Patent.  Patented July 25, 1916.

Application filed April 10, 1915. Serial No. 20,403.

*To all whom it may concern:*

Be it known that I, WILLIAM N. SPRINGER, a citizen of the United States, and a resident of South Bend, in the county of St. Joseph and State of Indiana, have invented certain new and useful Improvements in Engine Gang-Plows; and I do hereby declare the following to be a full, clear, and exact description of the invention, such as will enable others skilled in the art to which it appertains to make and use the same.

This invention relates to improvement in plows of the engine gang type,—the object of the invention being to simplify and reduce the number of parts, as well as to minimize the weight of an engine plow comprising power lifting mechanism and plow adjusting means associated therewith.

With this and other objects in view, the invention consists in certain novel features of construction and combinations of parts as hereinafter set forth and pointed out in the claims.

In the accompanying drawings; Figure 1 is a side elevation of an engine gang plow embodying my improvements; Fig. 2 is a plan view and Figs. 3, 4, 5 and 6 are views showing certain details of construction.

1, 2, 3 represent the several plows of a gang and at their forward ends, the beams of the several plows are connected, through the medium of coupling members 4, with a horizontal draft bar 5 common to all the plows. Clevises 6 may be adjustably attached to the draft bar 5 and are intended to be connected in any suitable manner, with a tractor, not shown. The several plows are spaced apart and arranged in the manner customary with gang plows and their beams are connected by rigid spacing braces 7, the forward brace which extends from the beam of plow 2 to the beam of plow 3 projecting forwardly beyond the front end of the latter and constituting, in effect, an extension of the same for connection with the draft bar 5.

The beams of the several plows are provided with suitable bearings for the accommodation of two axles 8, 9 having cranked ends 10, 11 respectively, mounted in the hubs of land and furrow wheels 12, 13 respectively. The forward axle 9 may, for convenience, be referred to as the furrow wheel axle, and the axle 8 may be termed the land wheel axle.

An arm 14 may be clamped to the crank 10 near its juncture with the axle 8 and made to depend therefrom for attachment of one end of a counterbalancing spring 15, the forward end of the latter being connected with the draft bar 5.

A bracket 16 is rigidly bolted to and projects above the beam of plow 1, said bracket being formed with an outwardly projecting, elongated enlargement 17. This enlargement is preferably made hollow and provided at its forward edge with a flange 18, said flanged forward edge of the enlargement being curved to form a segment of a circle of which the axis of the furrow wheel axle 9, is the center, for a purpose which will be hereinafter made apparent.

A U-shaped bracket 19 is secured to the draft bar 5, near one end thereof and projects rearwardly therefrom. Between the parallel members of this bracket, the forward end of a frame or plate 20 is pivotally connected by means of a bolt 21, the latter being in line with the axis of the furrow wheel axle 9. The frame 20 is made with an upward extension 22 having a rear segmental edge formed with a groove 23 to receive the segmental flange 18 on the bracket 16, so that when the frame 20 is raised or lowered on its pivotal support at 21 it will be properly guided in its movements by sliding on the flange 18 of bracket 16.

The bracket 16 and frame 20 are normally held against movement by means of a screw rod 24,—the upper portion of which has a swivel mounting in a sleeve 25 pivotally attached to the upper portion of the bracket 16, and the threaded portion of said rod passes through a threaded sleeve 26 pivotally mounted to the upward enlargement 22 of the frame 20. The upper end of the rod 24 is provided with a crank handle 27 by means of which said rod may be operated manually for a purpose hereinafter explained.

The pivoted frame 20 is made with an elongated slot 28 which is slightly curved to mark the segment of a circle of which the pivotal mounting of said bracket is the center, and through this slot, the spindle portion 29 of the furrow wheel axle 9 passes. The frame 20 is provided with an outwardly projecting curved flange 30 and above the slot 28 a roller 31 is mounted on said frame 20. Between the roller 31 and the flange 30, a cam 32 is secured to the spindle portion of axle 9, said cam normally engaging the roller, and thus it will be seen that the forward portion of the plow structure is supported on the axle 9 and the latter by the furrow wheel 13. The other side of the plow structure is supported by the land wheel 12 in which the journal portion of the crank axle 8 is mounted,—means being provided for normally holding said crank axle against turning, and for turning the same for adjusting purposes, as will now be explained.

An arm 33 is rigidly secured to the horizontal portion of the axle 8 and made with a bifurcated upper end, in which a sleeve 34 is pivotally mounted. A lever 35 is loosely mounted on the axle 8 in proximity to the arm 33 and is made with a bifurcated portion 36 and a depending portion 37. Parallel arms 38 are pivotally connected at their upper ends with the bifurcated portion 36 of the lever 35 and are connected by pins 39 arranged to engage in notches 40 in the depending portion 37 of said lever. A screw rod 41 has a swivel mounting in the sleeve 34 on the fixed arm 33 and the threaded portion of this rod passes through a threaded sleeve 42 pivotally mounted between the depending pivoted arm 38. A crank handle 43 is secured to the upper end of the rod 41 for facilitating the manual operation of the latter. A threaded sleeve 44 is pivotally mounted between the lower ends of the pivoted arms 38 and receives the threaded portion of a rod 45, the lower, forward end of said rod being pivotally connected with the rear end of an arm 46, securely clamped to the crank portion of the forward axle 9.

From the construction and arrangements of parts hereinbefore described, it will be understood that when the screw rods 24 and 41 are turned in one direction, the plows will be raised or lowered to an extent sufficient to enable the plow bodies or soil-engaging members to be adjusted for depth of plowing. Thus, when the rod 24 has imparted to it, a right hand rotation, the tendency will be to force the frame 20 in a downward direction, but as said frame is supported upon the spindle portion of the axle 9 (as viewed in Fig. 1,) it cannot be depressed, and hence the bracket 16 must rise, and as said bracket is rigid with the plows, the latter must also rise. Manipulating the screw rod 24 as above described will not only cause the plows to rise, but will also cause their beams to pivot somewhat on the land wheel axle 8 and thus the pitch of the plow bodies may be changed or adjusted. When it is desired, however, to raise the plows in a manner to decrease the depth of plowing without changing the pitch of the plow bodies, the screw rod 41 must also be manipulated. Thus, should the screw rod 41 be turned to the left, the tendency would be to draw the pivoted arms 38 and lever 35 forwardly, but as such movement of said arms and lever will be prevented by reason of the connection of said arms with the forward axle (through the medium of the rod 45 and arm 46), it follows that the fixed arm 33 on axle 8 must move rearwardly, thus causing said axle to turn and its cranked end to bear downwardly on its mounting in the wheel 12, thereby causing the plows to rise. It is apparent that by operating both of the screw rods 24 and 41, the plow bodies may be raised or lowered to adjust the depth of plowing without altering their pitch. It is also apparent that by turning the rod 41 a greater or less distance than is necessary to raise or lower the plows in conformity with the adjustment which may have been effected by manipulation of the screw rod 24, the plow structure will be tilted transversely, and may thus be adjusted for the purpose of leveling the plows.

The furrow wheel is normally free to rotate on the spindle portion of the crank axle 9 and the hub of this wheel carries a ratchet wheel 47. A cam plate 48 is mounted on the spindle portion of the crank axle 9 and is secured to the cam 32 so as to be rotatable therewith. This cam plate carries a pivoted dog 49 having a tail 50 to overlie a recess 51 in the curved edge of said cam plate. A spring 52 tends to move the dog toward the ratchet wheel. A lever 53 is pivoted at 54 to the pivoted frame 20 and a lever 55 is pivoted at a point between its end to said frame, as indicated at 56, the upper portions of said levers being connected by a rod or bar 57. The lever 53 carries a roller 58 to enter the recess 51 in the cam plate 48 and engage the tail of the dog 49, so as to normally prevent engagement of said dog with the ratchet wheel 47. The lever 55 carries a roller 59 to enter the recess 51 in the cam plate and disengage the dog from the ratchet wheel. The levers 53 and 55 are retained in their normal positions when the plow is at work, with the roller 58 on the lever 53 in the recess 51 of cam plate 48, by means of a spring 60 attached at one end to the lever 53 and at the other end to an eye-bolt 61, which passes through a flange 62 on a fixed plate or bar 63.

A shaft 64 is mounted in the couplings 4, 4 which connect the plows 1 and 2 with the draft bar 5, and in the U-shaped bracket 19. An arm 65 is secured to the shaft 64 at one end of the latter, and this arm is connected, by a rod 66 with the lever 53. A longer arm or lever 67 is secured to the inner end of the shaft 64, so as to be located approximately in line with the center of the plow structure, and to this arm or lever, one end of a cord (not shown) may be connected and extended to the tractor within convenient reach of the operator thereon.

When the operator desires to cause the plows to be raised out of and above the ground automatically by power derived from the furrow wheel 13, he will pull the cord attached to the lever 67 and thus shift the levers 53 and 55. By this manipulation of said levers, the roller 58 on lever 53 will be moved out of the recess 51 of cam plate 48 and away from the tail of the dog 49, thus permitting the spring 52 to move said dog to engage the ratchet wheel 47. As the plow moves forwardly, motion will be imparted by the ratchet wheel 47 and dog 49 to the cam plate 48 and the cam 32, causing the coöperation of the latter with the roller 31 to raise the frame 20 on its pivotal support at 21. As the pivoted frame 20 is at this time locked to the bracket 16 on the plow 1, (by the screw rod 24), said bracket must also rise and thus cause the connected gang of plows to be raised out of the ground. When the pivoted frame 20 and bracket 16 are being raised as above explained, the tendency will be to raise the axle 8 and as the latter rises, it will be caused to turn (by reason of the connections 41, 38, 45, and 46 with the forward axle) and tend to press its cranked end downwardly,—thus so applying downward pressure upon the land wheel 12 as to assist in raising the plows completely out of the ground evenly.

The plows will be held in elevated position by the cam when the latter is in its upper position and the dog has been released from the ratchet wheel. Should the operator now cause the dog to engage the ratchet wheel, the cam and cam plate will be caused to complete their rotation and thus permit the plows to descend and assume their working positions as the machine moves forwardly.

Having fully described my invention what I claim as new and desire to secure by Letters-Patent, is:—

1. The combination with an axle, a plow, and a wheel in which said axle is mounted, of a frame pivotally supported at its forward end and mounted on said axle, a bracket secured to the plow, adjusting means connecting said bracket and pivoted frame for adjusting the plow, and means for raising said pivoted frame and bracket simultaneously on the pivotal support of the frame to raise the plow out of the ground.

2. The combination with two crank axles, one forwardly of the other, and wheels in which said crank axles are mounted, of a plow connected with both of said axles, a pivoted frame operatively associated with the forward axle, means adjustably connecting said pivoted frame with the plow, adjusting mechanism for the plow connected with the other axle, means connecting said adjusting mechanism with the forward axle, and means for swinging said pivoted frame to raise the forward portion of the plow and operate said other axle simultaneously.

3. The combination with an axle, a wheel in which said axle is mounted, and a plow mounted on said axle, of a pivoted frame movably mounted on the axle, a bracket secured to the plow, a manually operable screw mounted on the bracket, and a threaded part on said frame through which said screw passes.

4. The combination with an axle, a wheel in which said axle is mounted, and a plow connected at its forward end with said axle, of a frame mounted on the axle, a support for said frame coincident with the axis of the body of the axle, a bracket secured to the plow, coöperating segmental guiding means on said frame and bracket, a manually operable screw swiveled to the bracket, and a threaded part on the frame through which said screw passes.

5. The combination with a crank axle, a wheel in which said crank axle is mounted, and a plow having its forward end connected with said axle, of a frame pivotally supported in line with the axis of the body of said axle and having a segmental slot through which the spindle portion of said axle passes, a bracket secured to the plow, a manually operable screw swiveled to said bracket, a threaded part on the pivoted frame through which said screw passes, and means for swinging said pivoted frame on its pivotal support.

6. The combination with forward and rear crank axles and wheels in which said axles are mounted, of a plow connected with the rear axle, a frame mounted on the forward axle, a bracket secured to the plow, manually operable adjusting means connecting said bracket and frame for adjusting the plow relatively to the front axle, and manually operable means for turning the rear axle to adjust the plow.

7. The combination with forward and rear crank axles, and wheels in which said axles are mounted, of a plow connected with the rear axle, means for manually adjusting the plow relatively to the front axle, an arm fixed to the rear crank axle, a lever mounted loosely on said crank axle, a link pivoted to said lever, a manually operable screw rod swiveled to the fixed arm, a threaded part carried by said link and through which said threaded rod passes, and connections between said link and the forward axle.

8. The combination with two crank axles, and wheels in which said axles are mounted, of a plow connected with both axles, a fixed arm on one of said axles, a lever loose on said axle, a link pivoted to said lever, a manually operable screw rod swiveled to the fixed arm and adjustably connected with said link, an arm projecting from the other axle, a threaded rod pivoted to said arm, and a threaded sleeve pivoted to said link and through which said threaded rod passes.

9. The combination with two crank axles, and wheels in which said axles are mounted, of a plow connected with both of said axles, an arm fixed to one of said axles, a lever loose on the same axle and having a depending portion, links pivoted to said lever and adapted to engage the depending portion thereof, an arm secured to and projecting from the crank of the other axle, a threaded rod pivotally attached to said arm, a threaded sleeve pivotally connected with said links and receiving the threaded rod, a threaded sleeve pivotally attached to the upper portions of said links, and a manually operable screw swiveled to the fixed arm on the first-mentioned axle and passing through said last-mentioned threaded sleeve.

In testimony whereof, I have signed this specification in the presence of two subscribing witnesses.

WILLIAM N. SPRINGER.

Witnesses:
 EDWIN NICAR,
 KATE E. BUCKLEY.